(12) United States Patent
Huberland (10) Patent No.: US 7,789,938 B2
(45) Date of Patent: Sep. 7, 2010

(54) DEVICE FOR DRYING COMPRESSED GAS AND METHOD APPLIED THEREBY

(75) Inventor: Filip Gustaaf M. Huberland, Duffel (BE)

(73) Assignee: Atlas Copco Airpower, naamloze vennootschap, Wilrijk (BE)

( * ) Notice: Subject to any disclaimer, the term of this patent is extended or adjusted under 35 U.S.C. 154(b) by 218 days.

(21) Appl. No.: 12/225,160

(22) PCT Filed: Mar. 5, 2007

(86) PCT No.: PCT/BE2007/000021

§ 371 (c)(1),
(2), (4) Date: Sep. 16, 2008

(87) PCT Pub. No.: WO2007/106958

PCT Pub. Date: Sep. 27, 2007

(65) Prior Publication Data

US 2009/0165643 A1  Jul. 2, 2009

(30) Foreign Application Priority Data

Mar. 17, 2006 (BE) .................................. 2006/0169

(51) Int. Cl.
*B01D 53/26* (2006.01)

(52) U.S. Cl. ................. 95/14; 95/148; 96/112; 96/127; 96/130; 96/132

(58) Field of Classification Search ............ 96/109, 96/112, 121, 127, 128, 130–132, 143; 95/14, 95/90, 105, 148; 55/DIG. 17; 34/80
See application file for complete search history.

(56) References Cited

U.S. PATENT DOCUMENTS

| 3,710,547 | A | | 1/1973 | Nelson | |
|---|---|---|---|---|---|
| 4,233,038 | A | | 11/1980 | Tao | |
| 4,959,083 | A | * | 9/1990 | Garrett | 95/98 |
| 5,385,603 | A | * | 1/1995 | Sienack | 96/125 |
| 5,620,504 | A | * | 4/1997 | Coates | 96/114 |
| 5,681,369 | A | * | 10/1997 | Osborne | 95/93 |
| 5,755,857 | A | * | 5/1998 | Acharya et al. | 96/122 |
| 5,846,295 | A | * | 12/1998 | Kalbassi et al. | 95/105 |
| 6,319,303 | B1 | * | 11/2001 | Guillard et al. | 95/97 |

(Continued)

FOREIGN PATENT DOCUMENTS

EP  0 004 465 A  10/1979

(Continued)

*Primary Examiner*—Frank M Lawrence
(74) *Attorney, Agent, or Firm*—Bacon & Thomas, PLLC (57) ABSTRACT

Device for drying a compressed gas which consists of a compressed gas supply (2), two pressure vessels (33 and 34) which are provided with an input (37, respectively) and an output (39, 40 respectively) and a take-up point (32) for users of compressed dried gas, whereby at least two layers of desiccant (35 and 36) are provided in the pressure vessels (33 and 34), a first layer (35) made of a waterproof desiccant and a second layer (36) which is not necessarily made of a waterproof desiccant respectively, and whereby the pressure vessels (33 and 34) are provided with a second input (41, 42 respectively) for the supply of compressed gas to regenerate desiccant from the first layer (35).

17 Claims, 13 Drawing Sheets

U.S. PATENT DOCUMENTS

| | | | |
|---|---|---|---|
| 7,279,026 B1 * | 10/2007 | Fresch et al. | 95/124 |
| 7,727,312 B2 * | 6/2010 | Huberland | 96/126 |
| 2002/0134234 A1 | 9/2002 | Kalbassi et al. | |
| 2003/0221555 A1 | 12/2003 | Golden et al. | |

FOREIGN PATENT DOCUMENTS

| | | |
|---|---|---|
| EP | 1 226 860 A | 7/2002 |
| EP | 1 366 794 A | 12/2003 |
| FR | 2 084 301 A | 12/1971 |

* cited by examiner

DEVICE FOR DRYING COMPRESSED GAS AND METHOD APPLIED THEREBY

BACKGROUND OF THE INVENTION

A. Field

The present invention concerns a device for drying a compressed gas and a method applied thereby.

B. Related Art

In particular, the invention concerns a device for drying a compressed gas which mainly consists of a compressed gas supply, at least two pressure vessels which are filled with a desiccant and which are provided with a first input and an output and a take-up point for users of compressed dried gas, whereby these pressure vessels are alternately used as a drying vessel for drying the gas and as a regenerating vessel for regenerating the desiccant in the vessel concerned.

Such devices whereby the compressed gas to be dried is first guided through a first drying pressure vessel so as to be dried by the desiccant and whereby at least a part of this dried compressed gas, either or not after expansion, is sent through a second regenerating pressure vessel so as to absorb moisture from the desiccant and to thus regenerate this desiccant are already known.

When the desiccant in the drying pressure vessel is saturated, the flow-through order of the pressure vessels is altered, such that the first pressure vessel becomes a regenerating vessel, whereas the second pressure vessel becomes a drying pressure vessel.

Thus, by alternately using the above-mentioned pressure vessels as drying and regenerating pressure vessels, one pressure vessel is each time regenerated, whereas the other pressure vessel makes sure that the compressed gas is dried.

Such devices which are made as what are called "loss-free adsorption dryers" are already known, whereby a waterproof desiccant is provided in the pressure vessels, such as for example silica gel or activated aluminium oxide (alumina) and whereby, in order to regenerate the desiccant, the hot compressed gas is guided directly through the regenerating pressure vessel so as to absorb moisture from the desiccant, after which the moist gas is cooled and is sent, via a water separator, to the drying pressure vessel so as to be dried by the desiccant.

By the term "loss-free adsorption dryers" must be understood dryers whereby the desiccant is dried in the regenerating pressure vessel by means of the compression heat of the compressed gas.

By the term waterproof desiccant is to be understood a desiccant in this case which is not degraded under the influence of free, liquid water which might be present in the compressed gas or which could be generated by means of condensation on the desiccant of the water which is present as vapour in the compressed gas.

Such a waterproof desiccant is required for loss-free adsorption dryers, since the dew point of the compressed gas entering the regenerating vessel may be higher than the temperature of the desiccant, as a result of which the moisture which is present in said gas may precipitate on the desiccant.

A disadvantage of such known devices is that they do not make it possible to obtain very low pressure dew points for the compressed gas of for example −70° C. or less.

Devices which are made as what are called PSA dryers (pressure swing adsorption), whereby the compressed gas is sent through the drying pressure vessel so as to be dried by the desiccant and to be subsequently guided to a take-up point for users of dried compressed air are known as well.

In this case, a part of for example 15 to 20% of the gas which is dried in the drying pressure vessel is branched off and expanded to a lower pressure to be subsequently guided through the regenerating pressure vessel so as to regenerate the desiocant available there.

Such a device is disadvantageous in that it consumes a large part of the supplied compressed gas flow, in particular in the order of magnitude of 15 to 20% of this flow at a typical operating pressure of 7 bar, as a result of which the energy consumption is large.

Another disadvantage of such a known device is that, because of the large loss of compressed air, it must be oversized so as to be able to supply a certain flow of dried compressed air.

An additional disadvantage of such known devices is that the required flow of regeneration gas is inversely proportional to its operating pressure, which implies that at lower pressures, the consumption of compressed gas increases at the side of the dryer.

Finally, devices for drying compressed gas are also known whereby a part of typically 8 to 10% of the compressed gas, after expansion and heating, is used to regenerate the pressure vessel saturated with moisture.

A disadvantage of such a device is that, as the desiccant is only effective when its temperature is not too high, for example at less than 50° C., whereas it is regenerated at a high temperature, an additional cycle step is required during which the desiccant is cooled immediately after its regeneration.

For this cooling, use is often made of an expanded part of the dried compressed gas at the output of the device whose cooling power is small and as a result of which this said gas will have to be sent for a longer while through the pressure vessel with the freshly regenerated desiccant.

Often, at the end of the cooling cycle, a relatively large amount of residual heat will still be present in the desiccant, which initially causes a bad drying, as a result of which, when the pressure vessels are switched, i.e. when the drying pressure vessel becomes the regenerating pressure vessel and vice versa, high dew point peaks may occur in the compressed gas at the output of the device.

The present invention aims to remedy one or several of the above-mentioned and other disadvantages.

SUMMARY OF THE DISCLOSURE

To this end, the present invention concerns a device for drying a compressed gas, which mainly consists of a compressed gas supply, at least two pressure vessels which are filled with a desiccant and which are provided with a first input and an output and a take-up point for users of compressed dried gas, whereby these pressure vessels are alternately used as a drying vessel for drying the gas and as a regenerating vessel for regenerating the desiccant in the vessel concerned, whereby at least two layers of desiccant are provided in the above-mentioned pressure vessels, a first layer of waterproof desiccant and a second layer of a desiccant which is not necessarily waterproof respectively, and whereby the above-mentioned pressure vessels are provided with a second input for the supply of compressed gas for regenerating desiccant from the first layer and whereby the above-mentioned first input is provided opposite the first layer of waterproof desiccant, whereas the above-mentioned output is provided opposite the second layer of desiccant.

A major advantage of a device according to the invention is that it makes it possible to obtain a very low pressure dew point of the compressed gas with a low energy consumption as the above-mentioned first layer of desiccant can be regenerated "loss-free" by means of the compression heat of the compressed gas, whereas for the above-mentioned second layer of desiccant, use can be made for example of a molecular sieve allowing to obtain pressure dew points of −70° C. or less, and which is regenerated by means of a part of the dried compressed gas which, after being expanded and heated, is guided through this second layer of desiccant.

An additional advantage is that the above-mentioned part of the dried compressed gas for regenerating the second layer of desiccant can also be applied to carry out an additional drying of the first layer of desiccant during the regeneration cycle.

Another additional advantage of a device according to the invention is that the pressure vessels can be cooled by sending the compressed gas, after the cooling, through the pressure vessel to be cooled, such that no gas flow will be lost, whereas an efficient and short cooling cycle can nevertheless be obtained, as a result of which the life of the desiccant increases, as has been proven in practice.

The present invention also concerns a method for drying a compressed gas by means of a device according to the invention as described above, whereby this compressed gas is sent through a pressure vessel and whereby the above-mentioned pressure vessel is provided with at least two layers of desiccant, a first layer of desiccant made of a waterproof material and a second layer of desiccant made of a material which is not necessarily waterproof respectively, and whereby before it is dried, the gas is first guided through the above-mentioned first layer of desiccant and subsequently through the above-mentioned second layer of desiccant, whereas in order to regenerate the pressure vessel during a first phase, the compressed gas is only sent through the first layer of waterproof desiccant for a certain desired period of time in order to dry this waterproof desiccant, after which, during a second phase, compressed gas is first sent through the second layer of desiccant.

DESCRIPTION OF THE DRAWINGS

In order to better explain the characteristics of the present invention, the following preferred embodiments of a device according to the invention for drying a compressed gas as well as a method applied thereby are given as an example only without being limitative in any way, with reference to the accompanying drawings, in which.

DETAILED DESCRIPTION OF PREFERRED EMBODIMENTS OF THE INVENTION

Figure 1:
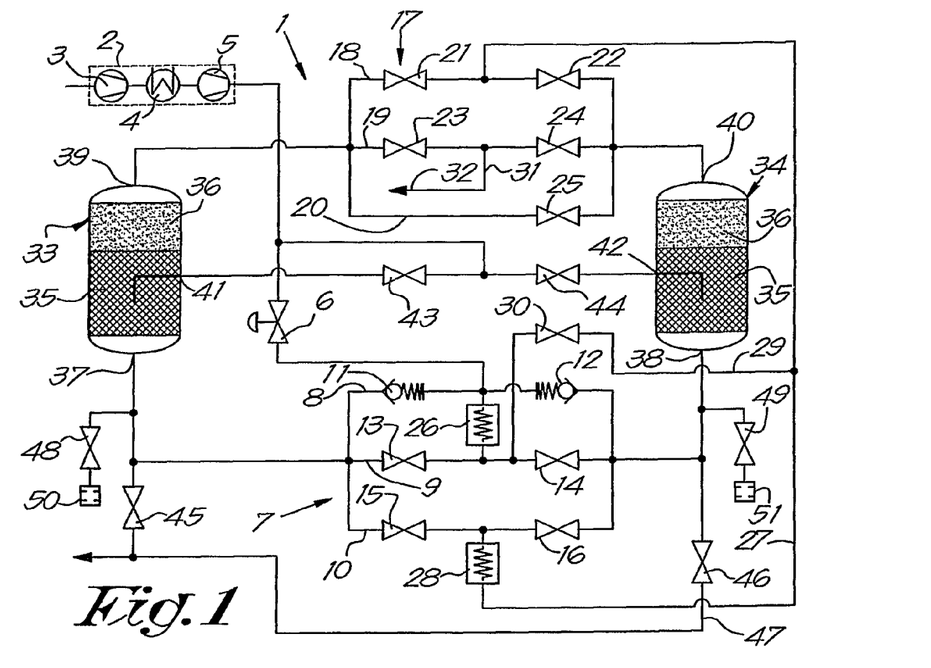
FIG. 1 represents a device according to the invention for drying compressed gas.

FIG. 1 represents a device 1 according to the invention for drying a compressed gas which is provided with a supply 2 of a compressed gas to be dried which is in this case formed of a first compression stage 3, an intermediate cooler 4 and a second compression stage 5.

The above-mentioned supply 2 is connected to a first distributing device 7 via the shut-off valve 6 made of three parallel, mutually connected pipes 8, 9 and 10, a first pipe 8 in which are provided two non-return valves 11-12 respectively with an opposite flow direction and a second and third pipe 9, 10 respectively, in which are each time provided two valves 13-14, 15-16 respectively which can be closed, which in this case but not necessarily are made in the form of controlled valves which are connected to a control system which is not represented in the figures.

In the given example, the above-mentioned non-return valves 11 and 12, in between which the above-mentioned supply 2 is connected to the first pipe 8, are placed such that they allow for a flow in the direction of one non-return valve to the other non-return valve in the pipe 8 concerned.

Further, the device 1 comprises a second distributing device 17 which, in this case, has practically the same dimensions and geometry as the above-mentioned first distributing device 7 and which also mainly consists of three parallel, mutually connected pipes 18, 19 and 20 respectively, namely a first pipe 18 and a second pipe 19 in which are each time provided two valves 21-22, 23-24 respectively which can be closed, which in this case but not necessarily are also made in the form of controlled valves which are connected to the above-mentioned control system.

In the third pipe 20 of the second distributing device 17 is provided only one valve 25 which can be closed, which is preferably also made as a controlled valve which is controlled by the control system.

The pipes 8 and 9 are mutually connected between the above-mentioned non-return valves 11-12 and the valves 13-14 via a cooler 26.

Between the closing valves 15 and 16 of the pipe 10 is connected a first branch 27 which provides a connection to the first distributing device 17 and which is connected to the pipe 18, in particular via a second cooler 28, between the valves 21 and 22 which can be closed.

Between the closing valves 13 and 14 of the pipe 9 is provided a second branch 29 which is connected to the above-mentioned first branch 27 via a valve 30 which can be closed, in particular between the cooler 28 and the pipe 18.

In the pipe 19, a third branch 31 which is connected to a take-up point 32 for supplying a user with dried compressed gas is connected between the valves 23 and 24 which can be closed.

Further, the device 1 for drying a compressed gas is also provided with two pressure vessels 33 and 34 which, according to the invention, are filled with at least two layers of desiccant, namely a first, lower layer 35 made of a waterproof desiccant such as for example silica gel, activated alumina or the like, and a second, upper layer 36 made of a desiccant which is not necessarily waterproof, such as for example in the form of a molecular sieve or the like, whereby the above-mentioned pressure vessels 33 and 34 are both provided with an input (inlets) 37, 38 respectively provided opposite the above-mentioned first layer of desiccant 35 and an output (outlet) 39, 40 respectively provided opposite the above-mentioned second layer of desiccant 36.

The above-mentioned first distributing device 7 is connected to the inputs 37 and 38 of the pressure vessels 33 and 34 with the respective parallel connections between the pipes 8, 9 and 10, whereas the second distributing device 17 is connected to the outputs 39 and 40 of these pressure vessels 33 and 34 with the respective parallel connections between the pipes 18, 19 and 20.

According to the invention, each of the above-mentioned pressure vessels 33 and 34 are provided with a second input (inlet) 41, 42 respectively which opens between the above-mentioned first and second layer of desiccant 35-36 and which is separately connected to the pipe between the compressed gas supply 2 and the shut-off valve 6 via a valve 43 which can be closed.

The above-mentioned valves 43 and 44 which can be closed are preferably also made as controlled valves which are connected to the above-mentioned control system.

The above-mentioned inputs 37 and 38 of the pressure vessels 33 and 34 are each connected to a common exhaust pipe 47 to the atmosphere via a valve 45, 46 respectively which can be closed.

Finally, between each of these inputs 87 and 38 on the one hand, and the valves 45 and 46 on the other hand, is provided a controllable exhaust valve 48, 49 respectively onto which is connected a sound absorber 50, 51 respectively.

The working of a device according to the invention for drying a compressed gas is very simple and is illustrated by means of the FIGS. 2 to 9, whereby valves which can be closed are represented as closed in black in these figures, whereas valves which are open are represented in white and the flow of the gas is represented in bold.

Figure 2:
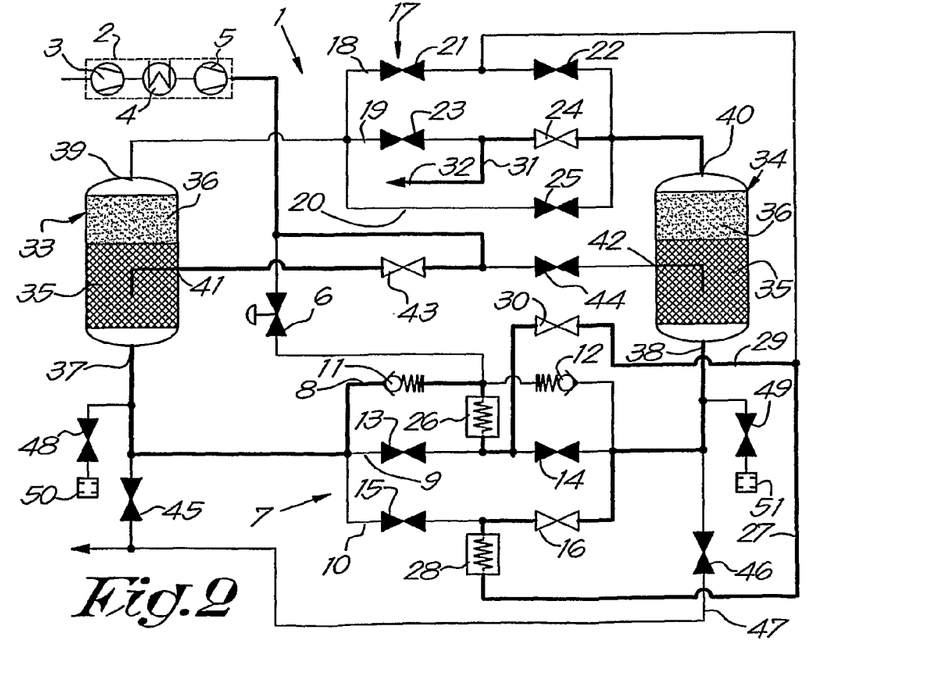
FIGS. 2 to 9 represent a method which can be applied with a device according to the invention.

In a first phase which is represented in FIG. 2, the pressure vessel 33 is used to regenerate the first layer of desiccant 35 which is present in this pressure vessel 33, and the pressure vessel 34 is used to dry the compressed gas coming from the supply 2.

To this end, the hot compressed gas coming from the supply 2 is guided via the opened valve 43 and along the second input 41 into the first pressure vessel 33.

Moisture which is situated in the first layer of desiccant 35 in this first pressure vessel 33 is absorbed by the hot compressed gas, such that the first layer of waterproof desiccant 35 is regenerated in this first pressure vessel 33.

Next, the gas flow is sent via the non-return valve 11 to the cooler 26 and then via the second branch 29 to the second cooler 28, as a result of which this gas flow is cooled and a part of the moisture situated in the gas flow will condense, to be then carried via the valve 16 through the second pressure vessel 34 where the gas is dried to a dew point of −70° C. or less by the available layers of desiccant 35 and 36.

The output 40 of the second pressure vessel 34 is connected to the take-up point 32 via the valve 24 at that time, onto which one or several non-represented users of dried compressed gas are connected.

It is clear that the flow rate coming from the supply 2 flows entirely and without any losses through the two pressure vessels 33 and 34 to the take-up point 32.

Figure 3:
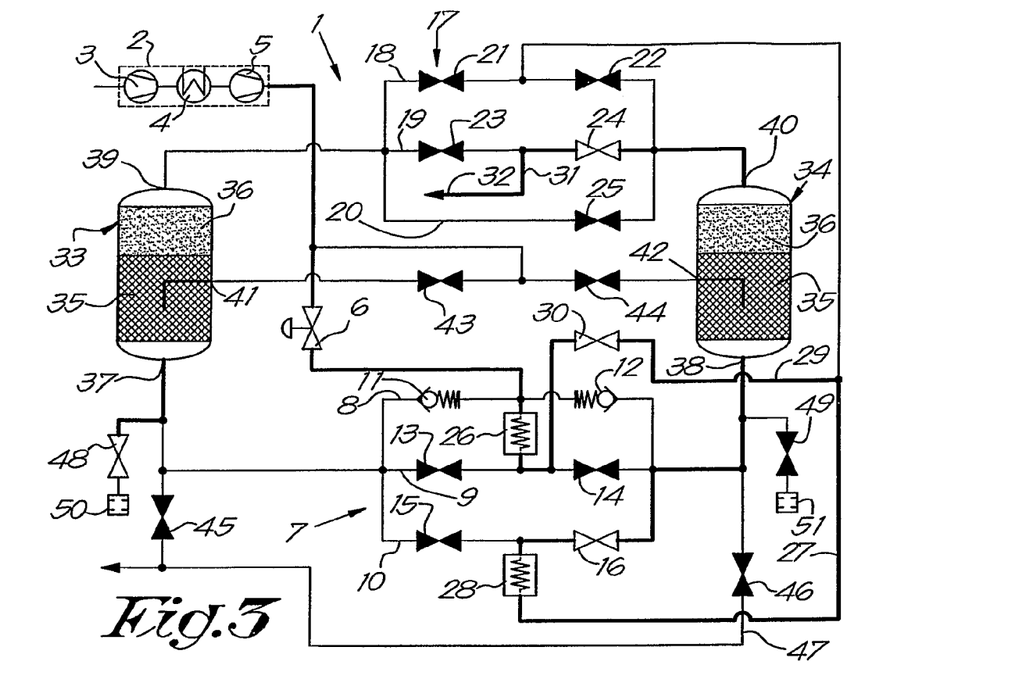

During the second phase, which is represented in FIG. 3 and which occurs at the end of the regeneration cycle of the first layer of desiccant 35 in the pressure vessel 33, the entire flow rate of compressed gas is guided to the pressure vessel 34 via the opened shut-off valve 6 and the coolers 26 and 28 so as to be dried, after which the dried compressed gas is sent to the take-up point 32 via the valve 24 in the pipe 19.

During this step the valve 48 is opened, such that the gas in the regenerating pressure vessel 33 can be blown off via the sound absorber 50.

Figure 4:
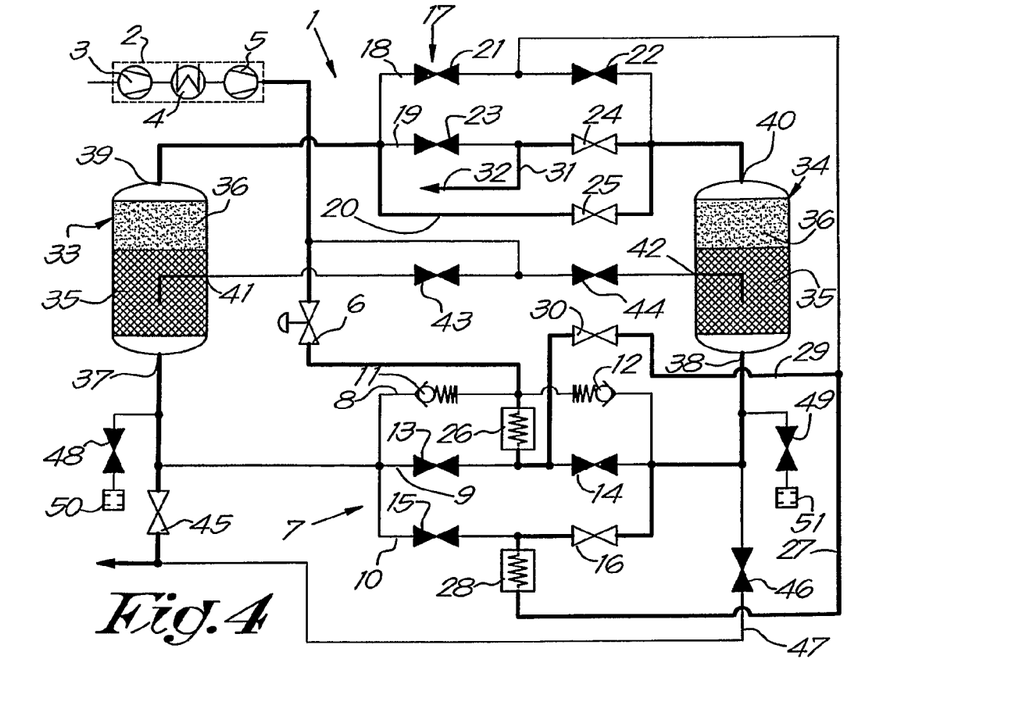

A third step according to the invention, which is represented in FIG. 4, consists in guiding the entire gas flow coming from the supply 2, analogous to step 2, to the drying pressure vessel 34 via coolers 26 and 28 in order to be dried, after which a part of the dried gas is guided to the output of the regenerating pressure vessel 33 via pipe 20 and the entirely or partly opened valve 25 in this case however, either or not after having been heated, for example in a heating element which is not represented in the figures.

The dry heated gas flow is then sent through the regenerating pressure vessel 33 so as to regenerate the second layer of desiccant 36 and the first layer of desiccant 35 respectively which has already been partly or entirely regenerated, to be subsequently blown off into the atmosphere via the valve 45 and the exhaust pipe 47.

A subsequent step consists in switching off the heating elements, if applicable, while the dried and expanded air flows further over both layers of desiccant according to the scheme represented in FIG. 4, as a result of which these layers can cool off, at least partly, or regenerate further.

Figure 5:
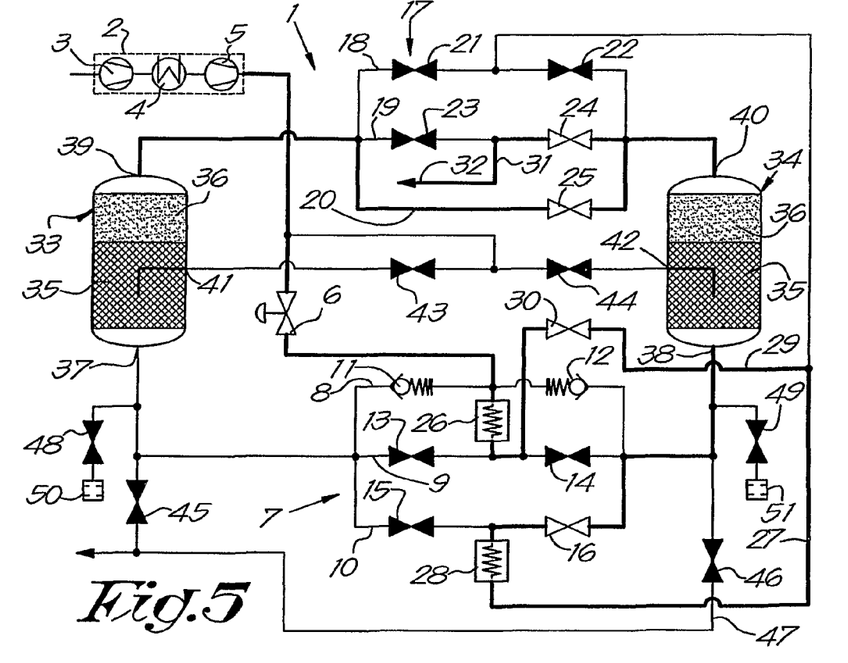

A following step which is applied in this case in the method for drying the compressed gas consists in closing the valve 45, as is represented in FIG. 5, such that a pressure is built up in the regenerating pressure vessel 33 by a part of the branched-off dried gas.

Figure 6:
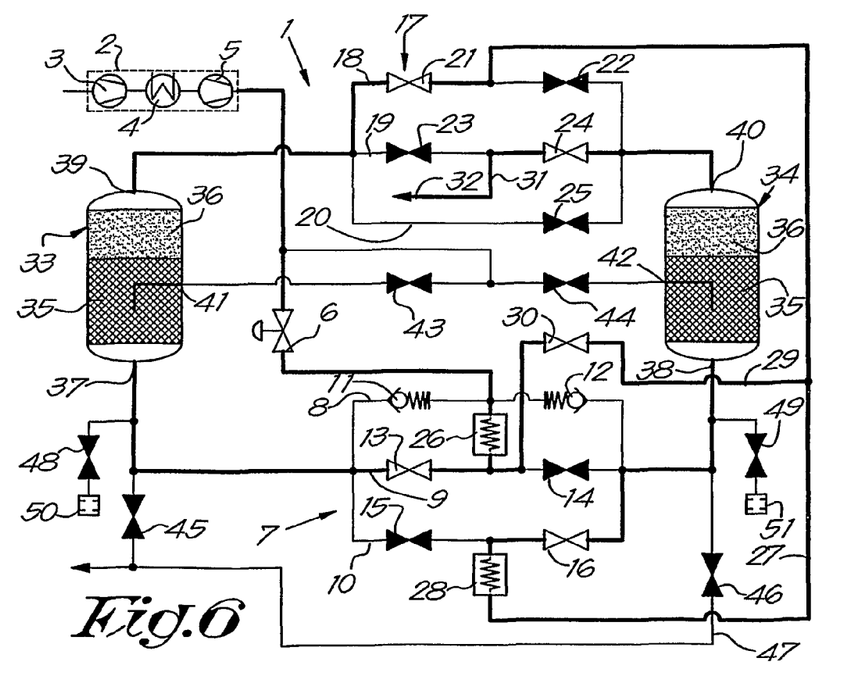

In a next phase, which is represented in FIG. 6 and which occurs when the pressure vessel 33 has been entirely regenerated and put under pressure, the compressed gas coming from the supply 2 is guided to the first cooler 26 via the shut-off valve 6, after which this gas flow is split in a first gas flow and a second gas flow.

The above-mentioned first gas flow is guided through the pressure vessel 33 via the valve 13 and the input 37 and then to the second cooler 28 via the valve 21 to be finally sent via the valve 16 and through the drying pressure vessel 34 through pipe 19 to the take-up point 32.

The above-mentioned second gas flow is guided to the above-mentioned first branch 27 via the entirely or partly opened valve 30 to be sent to the take-up point 32 together with the above-mentioned first gas flow via the cooler 28 and the drying pressure vessel 34.

Figure 7:
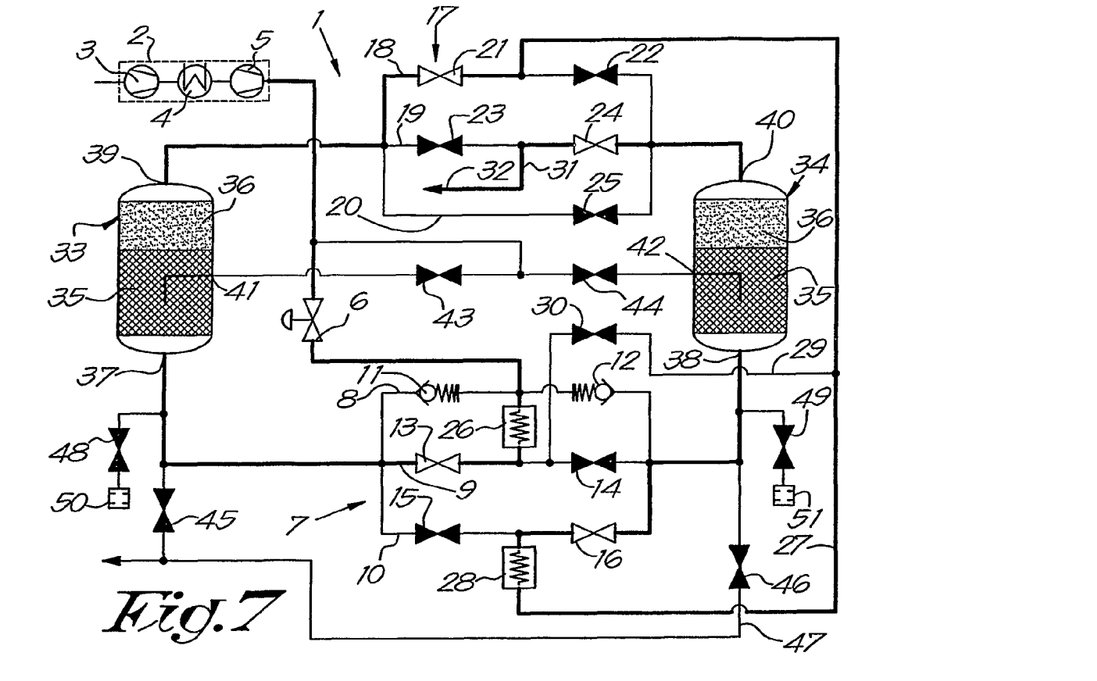

In the following step, which is represented in FIG. 7, the entire flow of compressed gas is guided to the input 37 of the first pressure vessel 33 via the shut-off valve 6 and the first cooler 26 to be further cooled and to be subsequently carried to the take-up point 32 via the valve 21 and the first branch 27, via the second cooler 28 and through the drying pressure vessel 34.

During the all but last step of the method, as is clear in FIG. 8, the compressed gas coming from the supply 2, is successively sent through the coolers 26 and 28 to be subsequently split in a first gas flow going through the first pressure vessel 33 and the valve 23 to the take-up point 32 and a second 5 gas flow which is guided through the second pressure vessel 34 and valve 24 to the take-up point 32.

Figure 9:
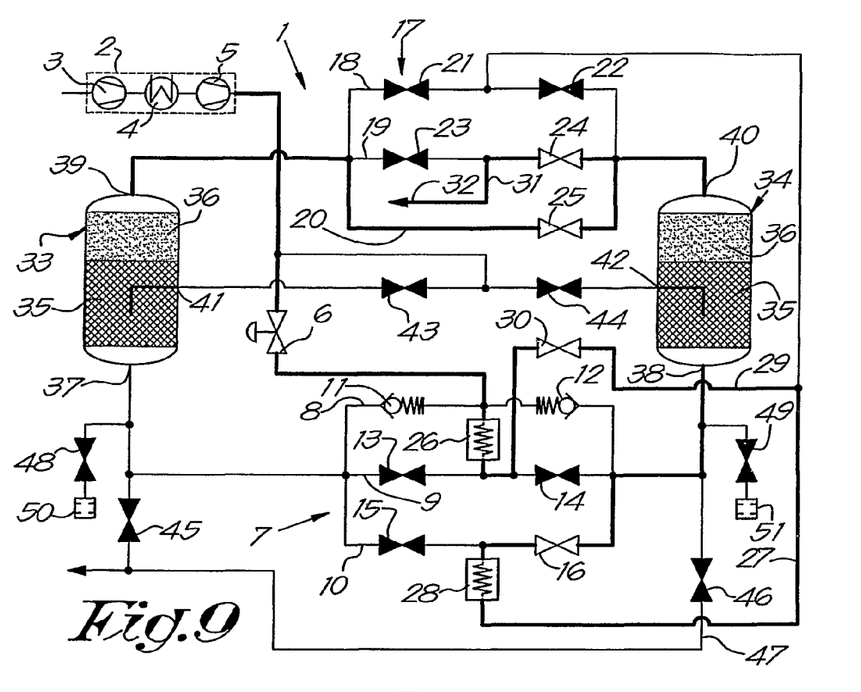

Finally, in the last phase, which is represented in FIG. 9, the entire flow of the compressed gas is successively carried via the coolers 26 and 28 through the practically entirely saturated second pressure vessel 34 and via the valve 24 to the above-mentioned take-up point 32. In order to constantly guarantee the same pressure in both pressure vessels, the valve 25 is opened in this last phase.

After this last phase we turn back to the first phase, but the pressure vessels 33 and 34 are switched and the first pressure vessel 33 now becomes the drying pressure vessel, whereas the second pressure vessel 34 becomes the regenerating pressure vessel, etcetera.

Since the first layer of waterproof desiccant 35, apart from a pressure drop of the gas between the inlet and outlet of the device, can be dried loss-free, it is possible to save energy by comparison with the conventional devices for drying a compressed gas.

Figure 10:
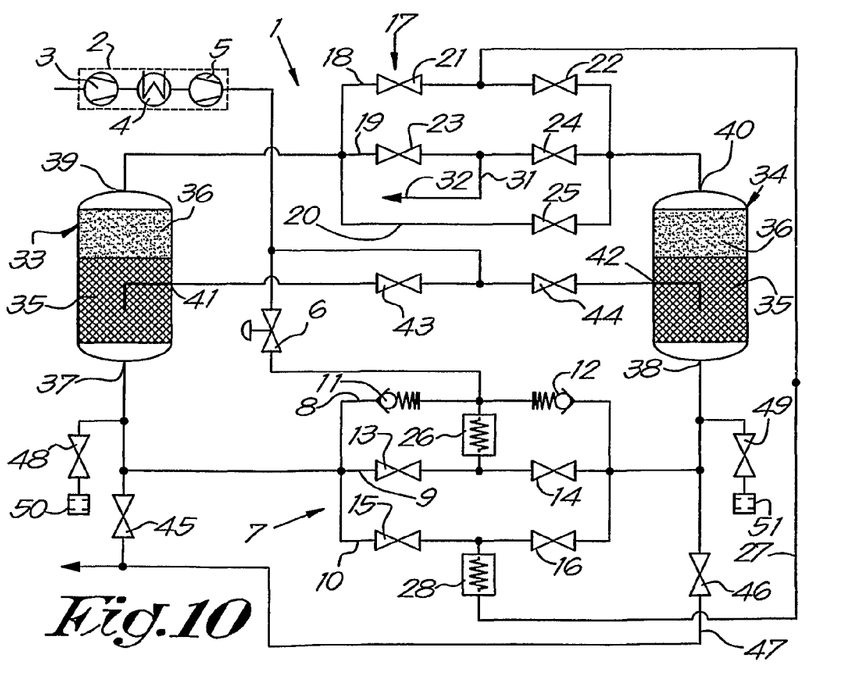
FIG. 10 represents a variant of a device according to FIG. 1.

FIG. 10 represents a variant of the device 1 according to the invention in which, by comparison with the device 1 represented in FIG. 1, the controlled valve 30 and the pipe 29 have been omitted, however without this having any influence on the functionality of the device 1.

Figure 11:
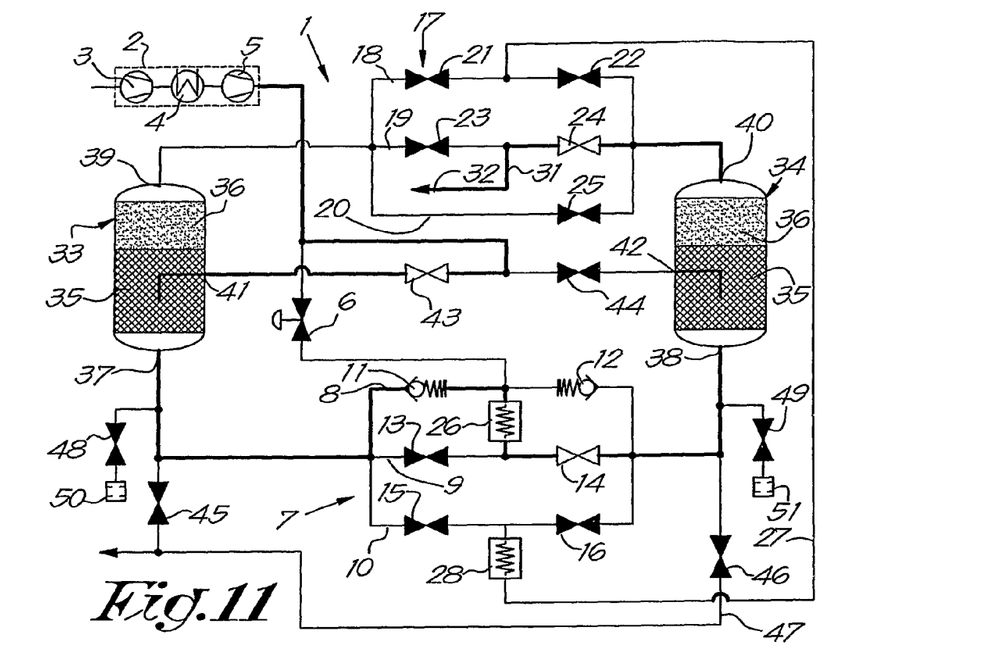
FIGS. 11 to 17 represent a method which can be applied with a device according to FIG. 10.

The functionality of the above-described first phase from FIG. 2 can then be maintained for example by sending the gas flow at the output of the cooler 26 over the opened valve 14 to the drying pressure vessel 34, as is represented in FIG. 11.

Figure 12:
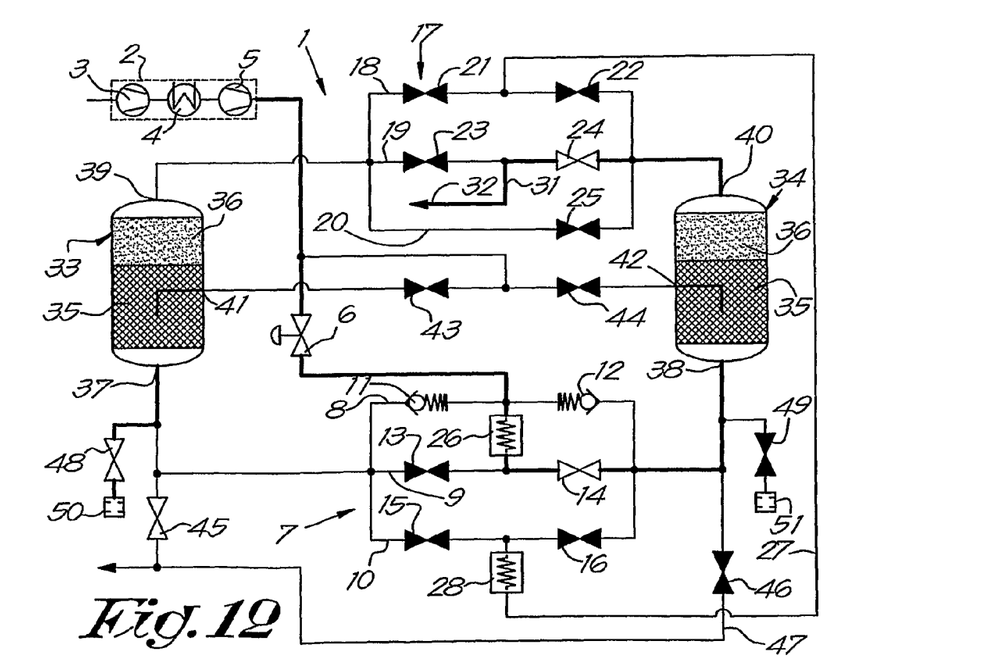
Figure 13:
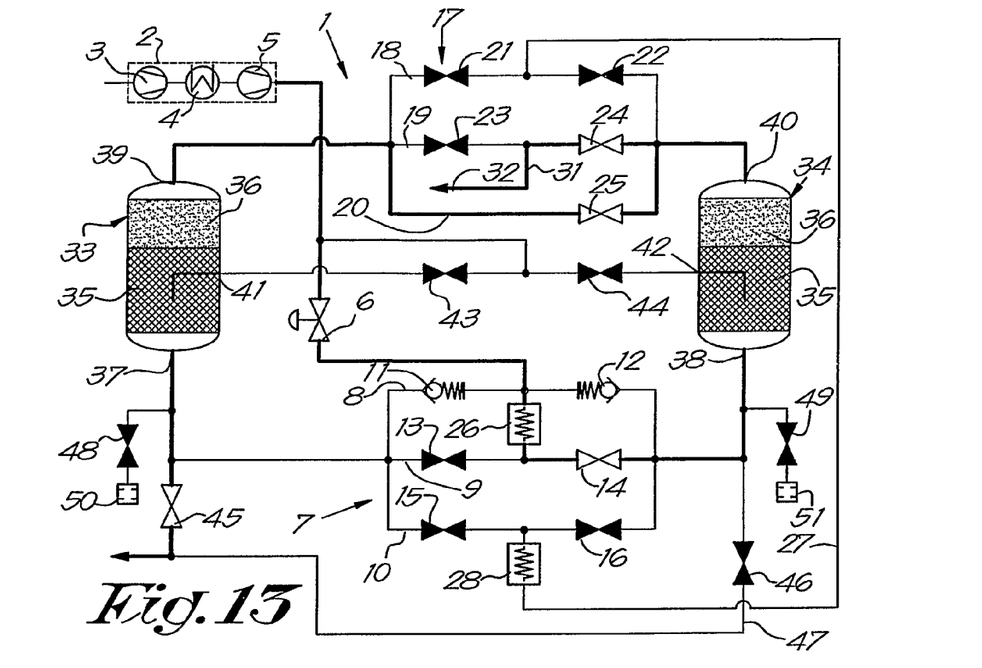

Similar to the phase as represented in FIG. 3, the pressure downfall in the pressure vessel 33 to be regenerated will take place in this embodiment as represented in FIG. 12, and the regeneration of the second layer, analogous to what is represented in FIG. 4, by opening the valve 45 as indicated in FIG. 13, and by either or not switching on a heating element which is not represented in the figures.

Figure 8:
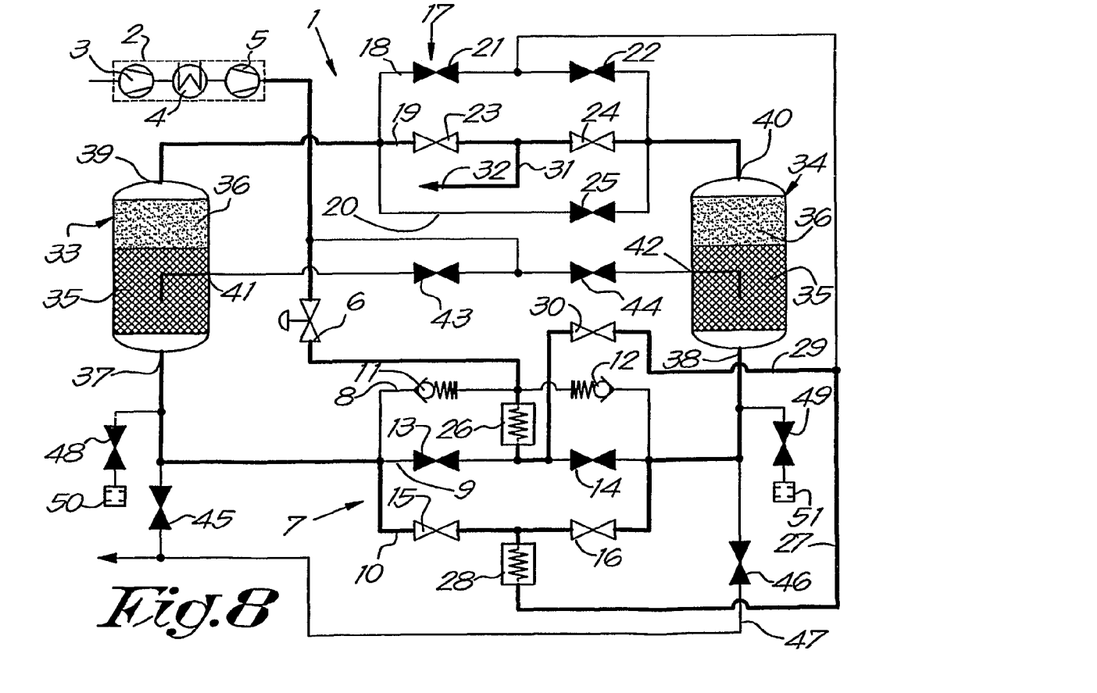
Figure 14:
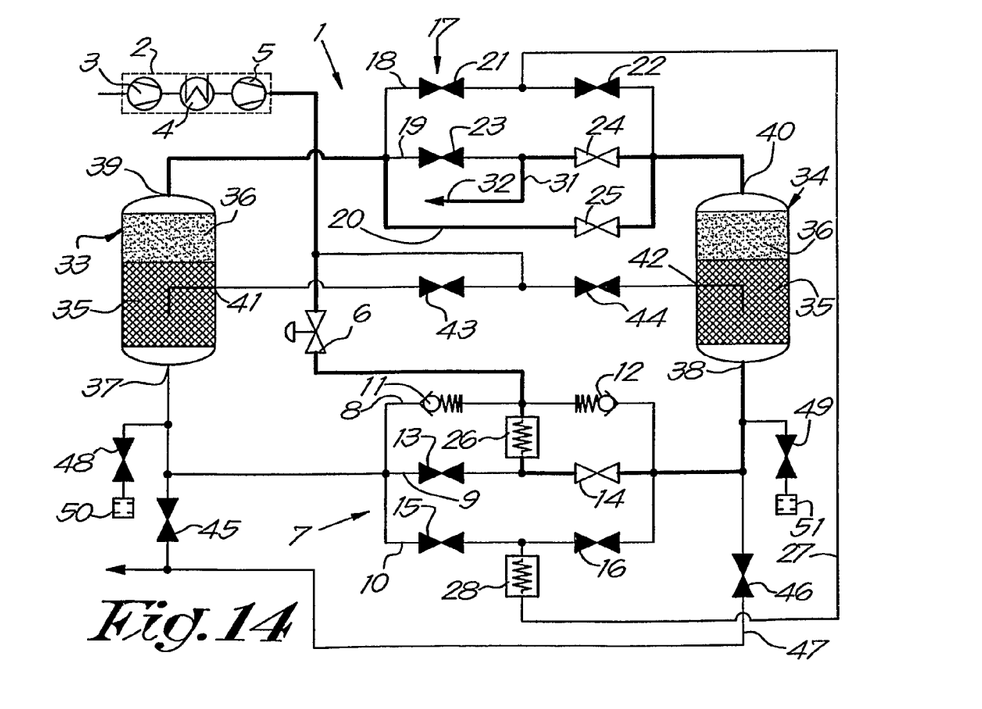
Figure 15:
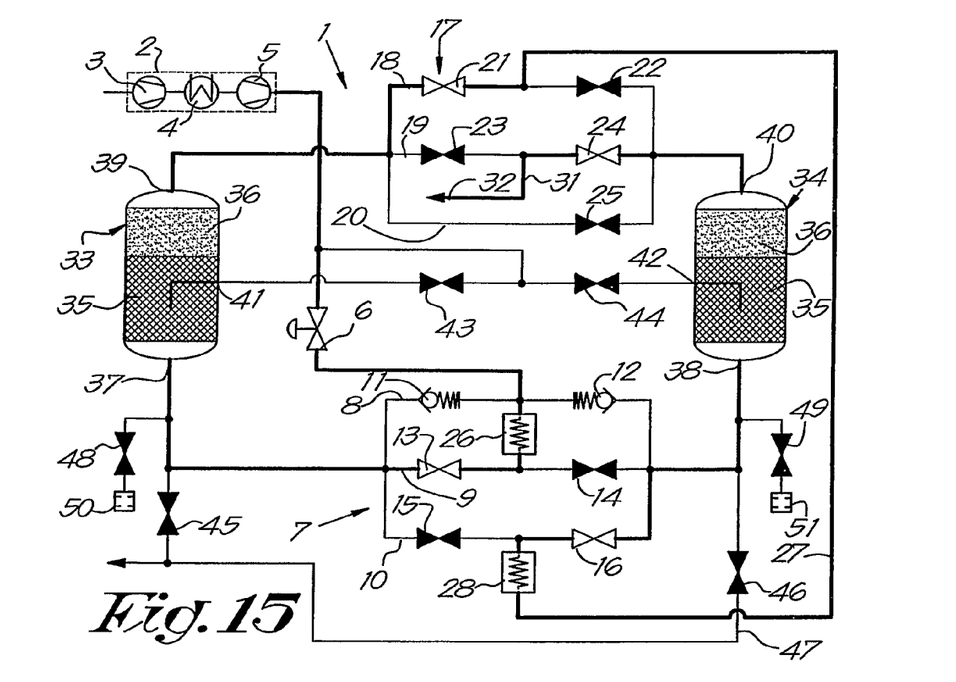
Figure 16:
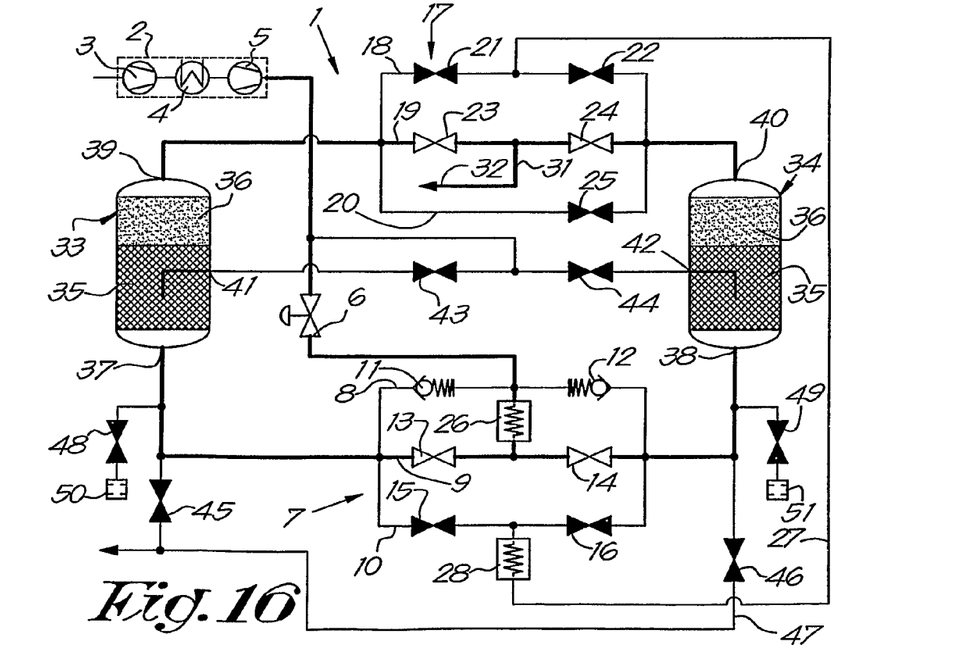

Next, analogous to what happens in the phase which is represented in FIG. 5, there is a pressure build-up which is represented in FIG. 14 for the present embodiment, followed by cooling phases which are represented in the FIGS. 15 and 16 and which correspond to the phases of the respective FIGS. 7 and 8.

Figure 17:
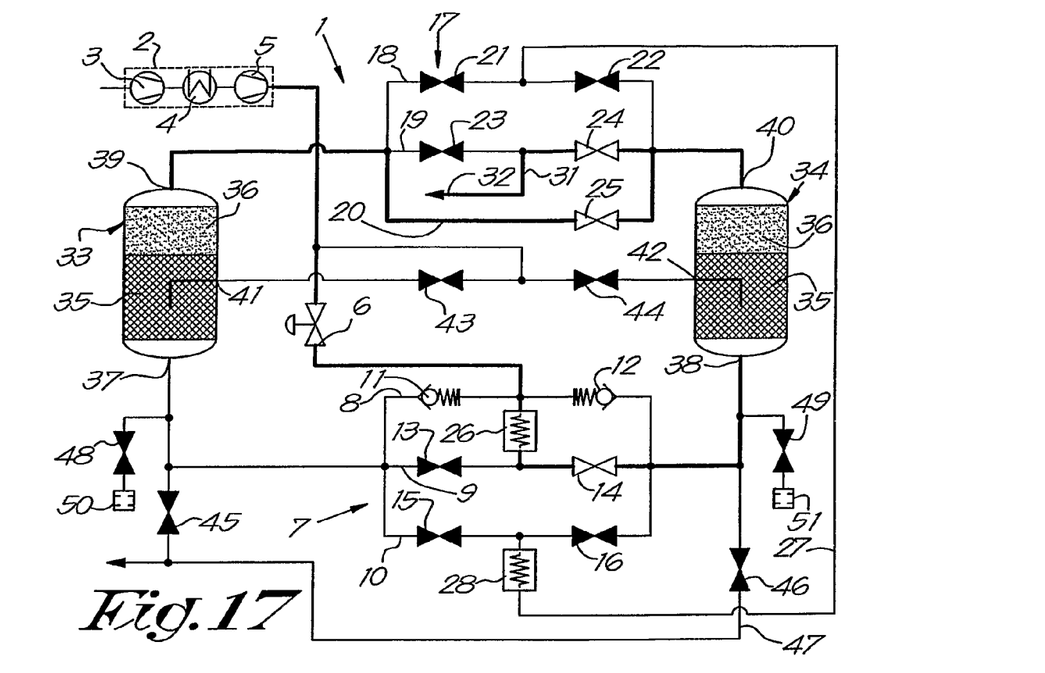

Finally, analogous to the phase from FIG. 9, the entire flow of compressed gas is sent to the take-up point 32 via the cooler 26 and the valve 14 through the almost saturated pressure vessel 34 according to the scheme in FIG. 17.

After this final phase the pressure vessels 33 and 34 are switched, such that the first pressure vessel 33 now becomes a drying pressure vessel, the second pressure vessel 34 becomes a regenerating pressure vessel, etcetera.

Figure 18:
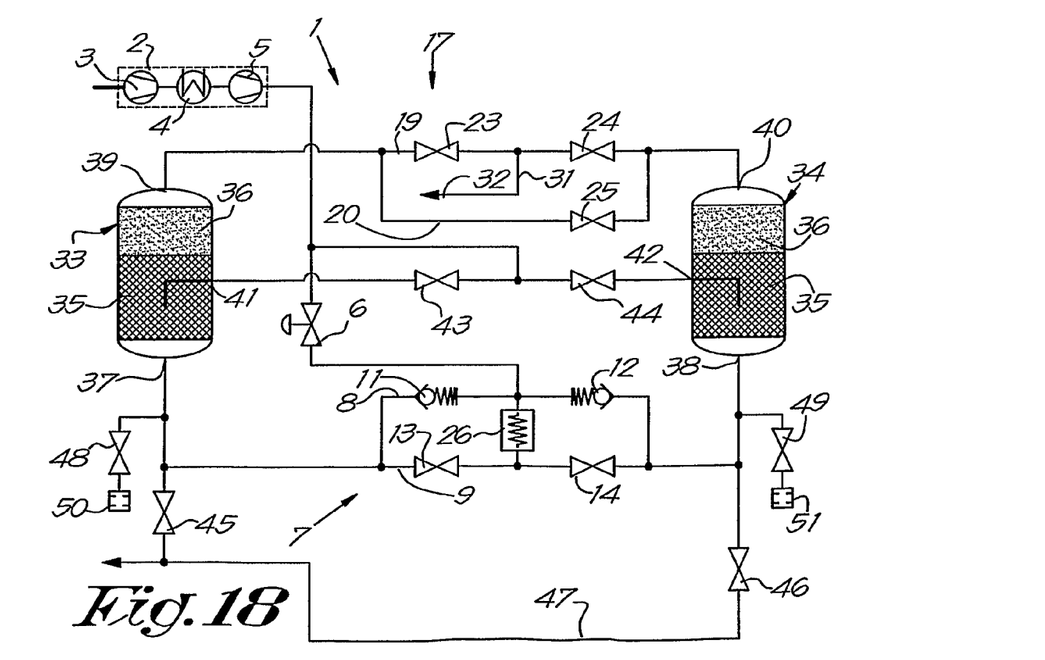
FIG. 18 represents another variant of a device according to FIG. 1.

FIG. 18 represents yet another embodiment of a device 1 according to the invention which also has a design which is practically analogous to that of the device 1 from FIG. 1, but with less pipes and valves then this first embodiment of device 1.

In this case however, the third pipe 10 of the first distributing device 7 and the first pipe 18 of the second distributing device 17 have been omitted, as represented in the embodiment of FIG. 1, as well as the first branch line 27, the second branch line 29 and the second cooler 28.

The working of the device 1 according to FIG. 18 is almost identical to that of the preceding embodiment and it is represented step by step in FIGS. 19 to 25.

Figure 19:
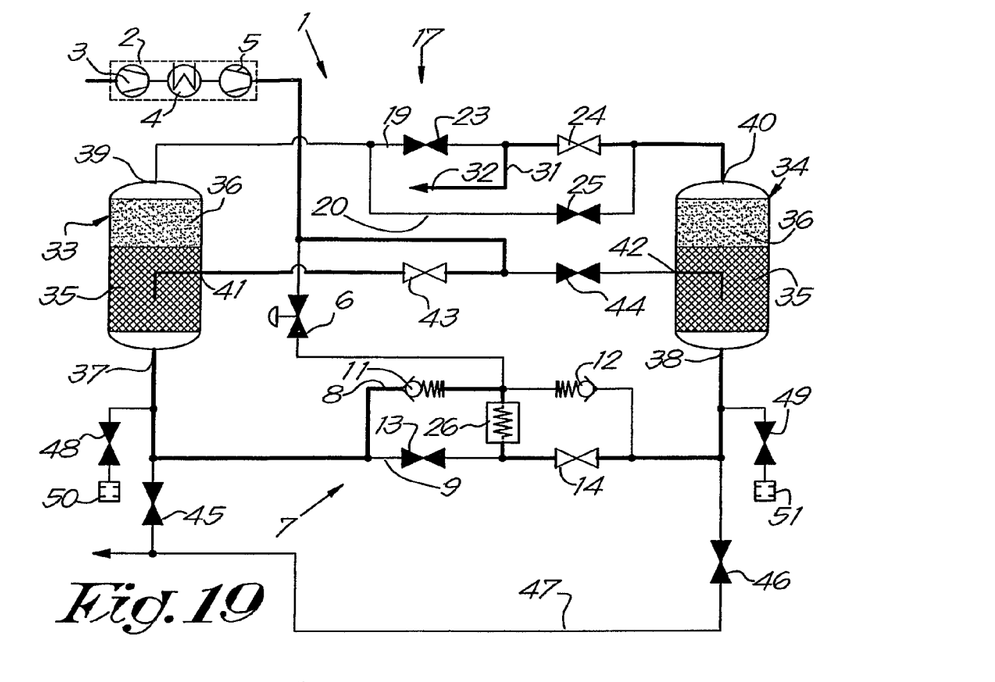
FIGS. 19 to 25 represent a method which can be applied with a device according to FIG. 18.

In the first step, which is represented in FIG. 19, analogous to the first step in the device according to FIG. 1, the entire flow of compressed gas coming from the supply 2 is sent via the second input 41 of the first regenerating pressure vessel 33 to the waterproof desiccant 35 so as to regenerate it.

Next, the compressed gas is sent through the cooler 26 to be then dried in the second drying pressure vessel 34 and to be guided to the take-up point 32 via the valve 24 and branch line 31.

Figure 20:
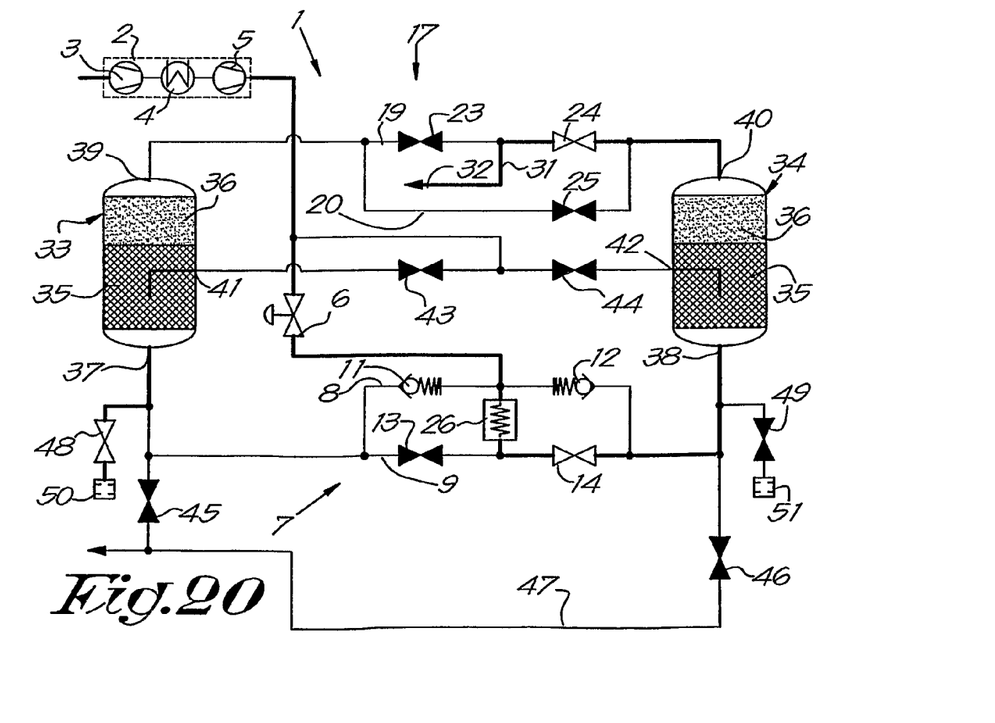

In the second step, which is represented in FIG. 20, corresponding to the phase which is represented in FIG. 3, the entire flow of compressed gas is first guided through the cooler 26 and then through the drying pressure vessel 34 to the take-up point 32.

During this step the valve 48 is opened, so that the gas in the regenerating pressure vessel 33 can be blown off via the sound absorber 50.

Figure 21:
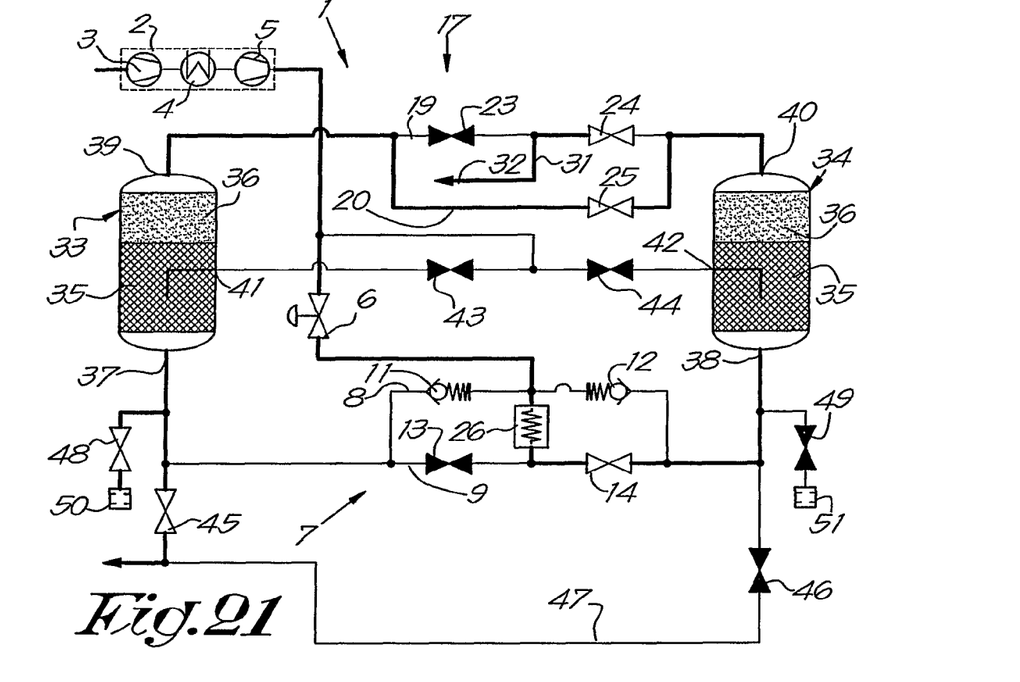

A third step, as represented in FIG. 21, consists according to the invention in guiding the entire gas flow coming from the supply 2, analogous to the step 2 in FIG. 20, to the drying pressure vessel 34 via the cooler 26 so as to be dried, after which a part of the dried gas flow is branched off via the pipe 20 in this case and, after having been heated in a heating element, for example, which is not represented in the figures, flows to the output 39 of the regenerating pressure vessel 33.

The dry, heated gas flow is then sent through the regenerating pressure vessel 33 so as to regenerate the second layer of desiccant 36 and the first layer of waterproof desiccant 35 respectively to be subsequently blown off into the atmosphere via the valve 45 and the exhaust pipe 47 and, possibly but not necessarily, via the valve 48.

Figure 22:
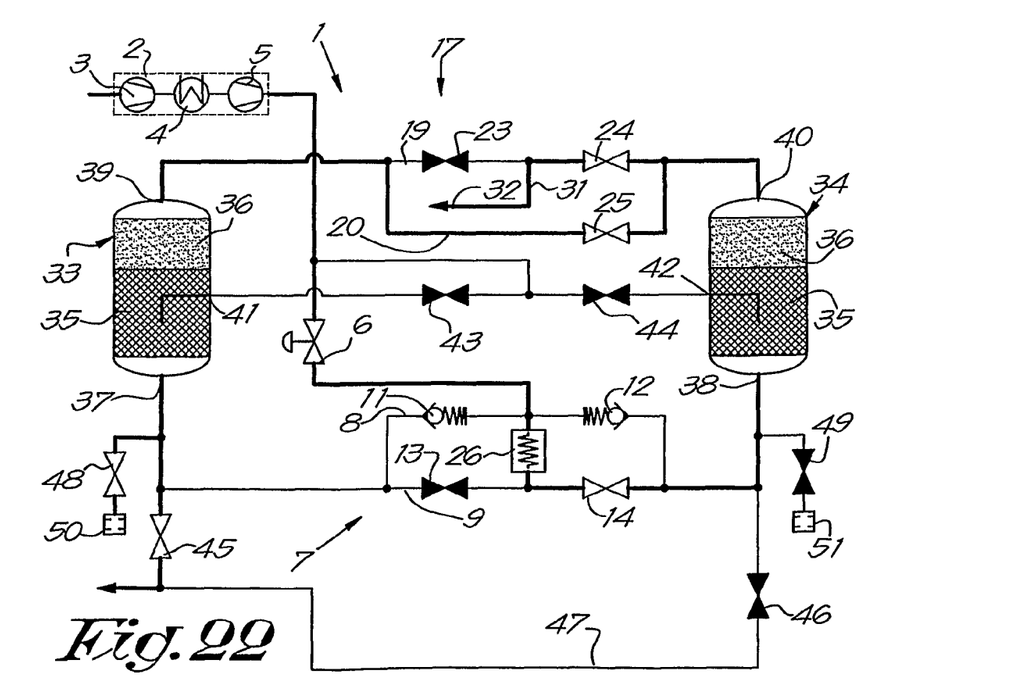

During the next step which is applied in this case in the method for drying the compressed gas and which is represented in FIG. 22, a part of the dried gas is expanded by the entirely or partly opened valve 25 to a lower pressure and the above-mentioned heating element is switched off, and this gas flow is then guided through the desiccant 35 and 36 so as to cool it to be subsequently blown off into the atmosphere via the valve 45 and the pipe 47 and, possibly but not necessarily, via the valve 48.

Figure 23:
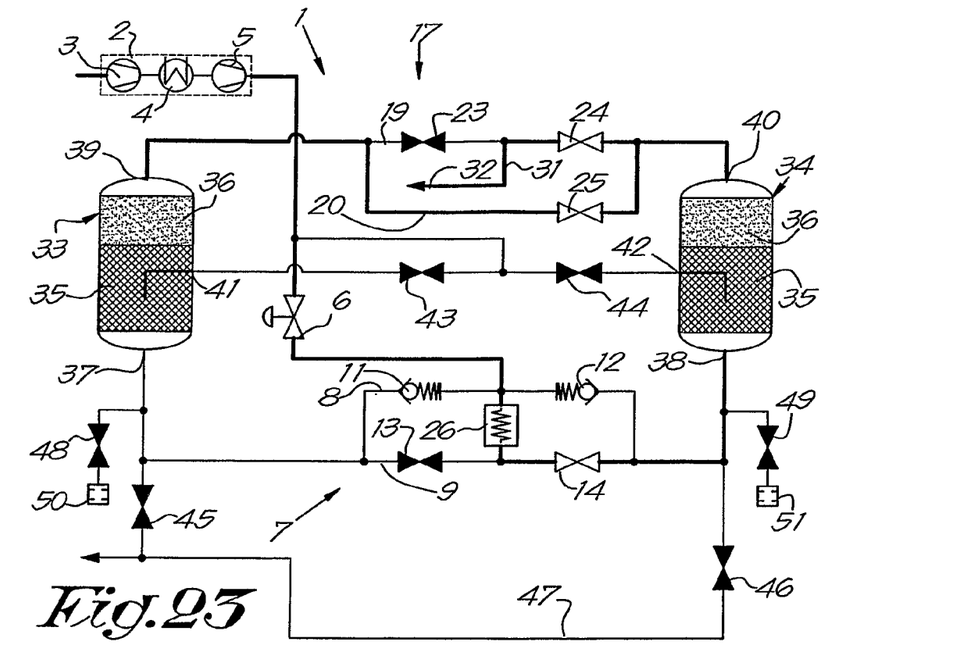

A next step consists, as represented in FIG. 23, in closing the valves 45 and 48, so that a pressure is built up in the first pressure vessel 33.

Figure 24:
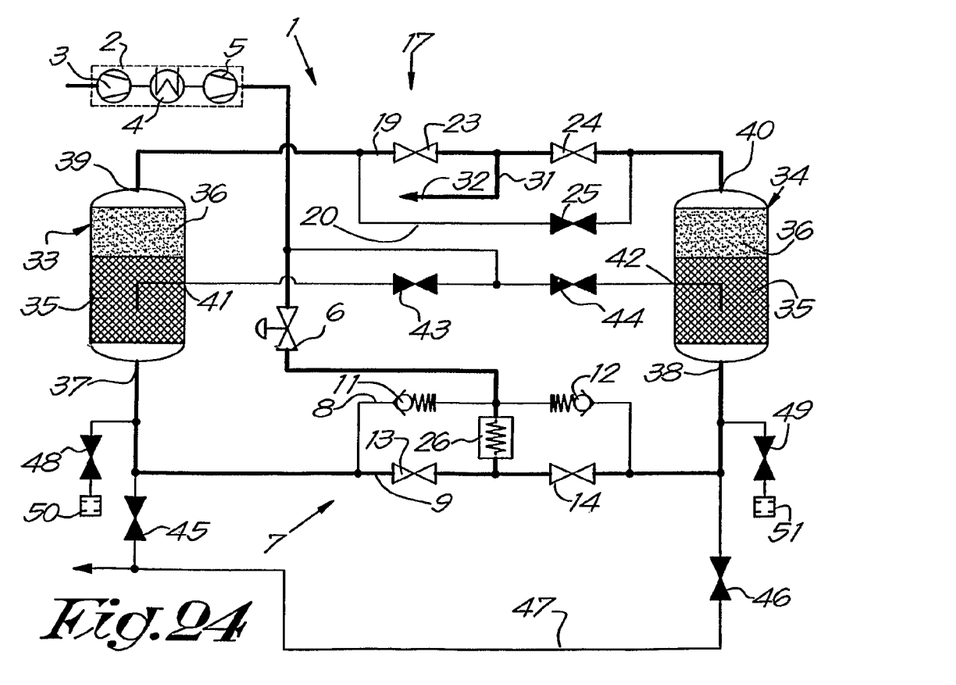

In a following phase, which is represented in FIG. 24 and which occurs when the pressure vessel 33 has been put entirely under pressure, the compressed gas coming from the supply 2 is guided to the cooler 26 via the shut-off valve 6, after which this gas flow is split in a first gas flow and a second gas flow.

The above-mentioned first gas flow is sent through the pressure vessel 33 via the valve 13 and the input 37 to further cool the desiccant 35 and 36 to be subsequently sent, via the valve 23, to the take-up point 32.

The above-mentioned second gas flow is guided via the valve 14 to the input 38 of the drying pressure vessel 34 to be subsequently sent, via the valve 24, together with the above-mentioned first gas flow, to the take-up point 32.

Figure 25:
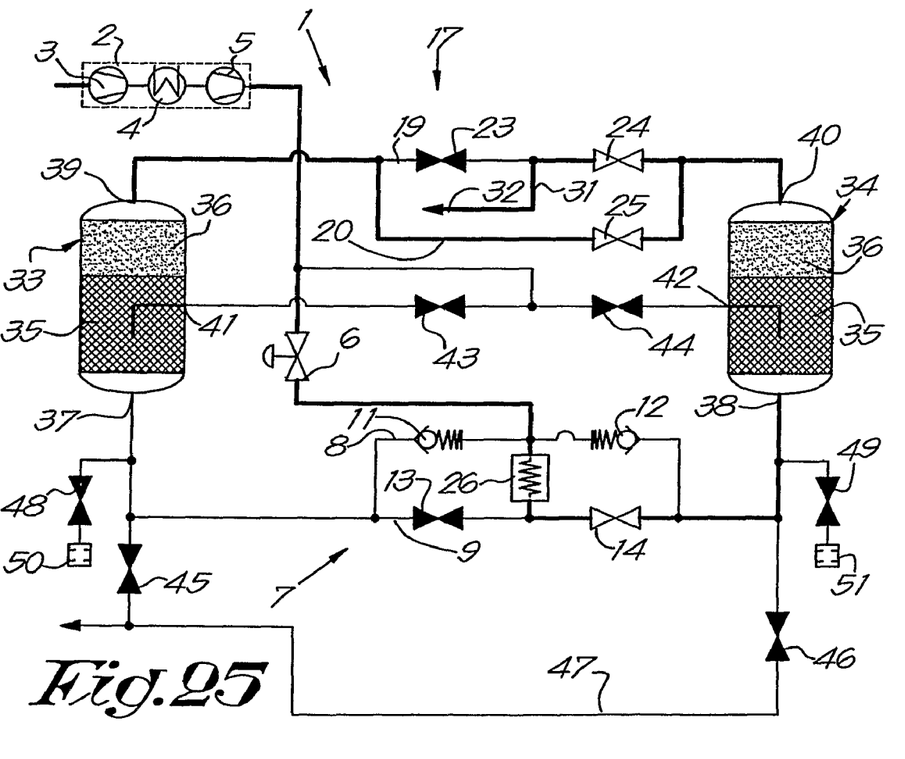

Finally, in a last phase which is represented in FIG. 25, the entire flow of the compressed gas is carried via the cooler 26 through the almost saturated second pressure vessel 34, after which the dried gas is sent to the above-mentioned take-up point 32.

After this last phase we turn back to the first phase, but the pressure vessels 33 and 34 are switched hereby, and the first pressure vessel 33 now becomes the drying pressure vessel, whereas the second pressure vessel 34 will be regenerated, etcetera.

According to a preferred characteristic of the invention which is not represented in the figures, at least one temperature sensor is provided near every layer of desiccant 35 and 36, and in particular under every layer of desiccant 35 and 36, which is preferably connected to the above-mentioned control system.

This is advantageous in that every regeneration step can be ended as soon as the temperature exceeds a pre-determined value, which indicates that the desiccant has dried sufficiently or has been regenerated, so that additional energy can be saved.

The present invention is by no means restricted to the embodiments described as an example and represented in the accompanying drawings; on the contrary, such a device according to the invention for drying a compressed gas and a method applied thereby can be realised in many ways while still remaining within the scope of the invention.

The invention claimed is:

1. Device for drying a hot compressed gas received from a supply of hot compressed gas to be dried, comprising at least two pressure vessels, each of which is filled with a desiccant and includes a first inlet arranged to receive hot compressed gas, and an outlet for discharge of dried compressed gas, and a take-up point in communication with the outlets for supplying compressed dried gas, said pressure vessels being alternately usable as a drying vessel for drying compressed gas to be dried and as a regenerating vessel for regenerating the desiccant in the respective vessel, said pressure vessels each including at least two layers of desiccant, including a first layer of waterproof desiccant and a second layer of a desiccant which is optionally waterproof, and wherein the pressure vessels each include a second input arranged to receive hot compressed gas for regenerating desiccant constituting the first layer by the heat of the hot compressed gas and wherein the first inlet is located so as to open into the first layer of waterproof desiccant, and the outlet is provided so as to discharge dried compressed gas after the gas exits the second layer of desiccant.

2. Device according to claim 1, wherein each second inlet opens into a pressure vessel between the first layer of waterproof desiccant and the second layer of desiccant.

3. Device according to claim 1, wherein the first layer of waterproof desiccant comprises silica gel or activated alumina.

4. Device according to claim 1, wherein the second layer of desiccant comprises a molecular sieve.

5. Device according to claim 1, wherein the second inlet of each pressure vessel is arranged to receive hot compressed gas via a closeable valve.

6. Device according to claim 1, including at least one heating element arranged to heat dried compressed gas discharged from a pressure vessel.

7. Device according to claim 1, including at least one temperature sensor located near each of the layers of desiccant.

8. Device according to claim 7, wherein each temperature sensor is connected to a control system which is arranged to control the closeable valves.

9. Method for drying a hot compressed gas using a device according to claim 1, comprising the steps: circulating a hot compressed gas through a first pressure vessel containing at least two layers of desiccant, including a first layer of desiccant made of a waterproof material and a second layer of desiccant which optionally may be waterproof, and guiding the hot compressed gas serially through the first layer of desiccant and then through the second layer of desiccant; regenerating the first pressure vessel during a first phase, during which the hot compressed gas is sent through the first layer of waterproof desiccant for a desired period of time in order to dry the waterproof desiccant, and thereafter, during a second phase, the hot compressed gas is sent through the second layer of desiccant.

10. Method according to claim 9, wherein, following the second phase, the hot compressed gas is sent again through the first layer of desiccant.

11. Method according to claim 9, wherein, following the passage of the hot compressed gas through the second layer of desiccant, the hot compressed gas is blown off from between the first layer and the second layer of desiccant.

12. Method according to claim 9, wherein, in order to regenerate the first layer of waterproof desiccant, hot compressed gas is circulated through the waterproof desiccant and the regeneration is carried out using the heat in the gas.

13. Method according to claim 9, wherein, for regenerating the second layer of desiccant, a part of the hot compressed gas coming from the outlet of a second drying pressure vessel is sent through the second layer of desiccant in the first pressure vessel.

14. Method according to claim 13, wherein the part of compressed gas coming from the outlet of the second drying pressure vessel is heated before it is fed through the second layer of desiccant in the first pressure vessel.

15. Method according to claim 13, wherein the part of compressed gas coming from the outlet of the second drying pressure vessel is expanded before being fed through the second layer of desiccant in the first pressure vessel.

16. Method according to claim 13, wherein the length of time for the regeneration phase is determined by a control system which is connected to valves which are opened and closed to control the supply of hot compressed gas through the pressure vessels.

17. Method according to claim 9, wherein, when a certain temperature value is exceeded in the first pressure vessel, the first or second regeneration phase is ended.

* * * * *